(12) United States Patent
Kim (10) Patent No.: US 8,951,663 B2
(45) Date of Patent: Feb. 10, 2015

(54) SECONDARY BATTERY

(75) Inventor: Dukjung Kim, Yongin-si (KR)

(73) Assignees: Samsung SDI Co., Ltd., Yongin-si, Gyeonggi-Do (KR); Robert Bosch GmbH, Stuttgart (DE)

( * ) Notice: Subject to any disclaimer, the term of this patent is extended or adjusted under 35 U.S.C. 154(b) by 785 days.

(21) Appl. No.: 13/271,508

(22) Filed: Oct. 12, 2011

(65) Prior Publication Data

US 2012/0121971 A1 May 17, 2012

Related U.S. Application Data (60) Provisional application No. 61/413,589, filed on Nov. 15, 2010.

(51) Int. Cl.
| | | |
|---|---|---|
| H01M 2/30 | (2006.01) | |
| H01M 2/06 | (2006.01) | |
| H01M 2/04 | (2006.01) | |
| H01M 2/26 | (2006.01) | |
| H01M 10/04 | (2006.01) | |

(52) U.S. Cl.
CPC .............. *H01M 2/06* (2013.01); *H01M 2/0473* (2013.01); *H01M 2/263* (2013.01); *H01M 10/0431* (2013.01)
USPC ............. 429/179; 429/65; 429/121; 429/122; 429/123; 429/161; 429/162; 429/163; 429/170; 429/172; 429/175; 429/208; 429/180; 429/181; 429/182; 429/183; 429/186

(58) Field of Classification Search
CPC ...... H01M 2/04; H01M 2/06; H01M 2002/00
USPC ........... 429/65, 121–123, 161–163, 170, 172, 429/175, 179–183, 186, 208
See application file for complete search history.

(56) References Cited

U.S. PATENT DOCUMENTS

| | | | |
|---|---|---|---|
| 2006/0063068 | A1 | 3/2006 | Cheon et al. |
| 2009/0186269 | A1 | 7/2009 | Kim et al. |
| 2010/0047686 | A1 | 2/2010 | Tsuchiya et al. |
| 2010/0092858 | A1 | 4/2010 | Takashiro et al. |

(Continued)

FOREIGN PATENT DOCUMENTS

| | | |
|---|---|---|
| JP | 08-153506 A | 6/1996 |
| JP | 2000-090908 A | 3/2000 |
| JP | 2000-138055 A | 5/2000 |

(Continued)

OTHER PUBLICATIONS

Korean Office Action in KR 10-2011-0119137, dated Dec. 20, 2012 (Kim).

(Continued)

*Primary Examiner* — Ula C. Ruddock
*Assistant Examiner* — Amanda Barrow
(74) *Attorney, Agent, or Firm* — Lee & Morse, P.C.

(57) ABSTRACT

According to an embodiment, a battery includes a cap plate, the cap plate having an opening penetrating therethrough and having at least a first protrusion extending from a first side, an electrode terminal extending through the opening in the cap plate, a collector extending from the electrode terminal, and a gasket interposed between a portion of the electrode terminal and the first side of the cap plate, the first protrusion extending through the gasket and the collector.

18 Claims, 7 Drawing Sheets

(56) References Cited

U.S. PATENT DOCUMENTS

2010/0266894 A1    10/2010   Byun et al.
2011/0300419 A1*   12/2011   Byun .............................. 429/61

FOREIGN PATENT DOCUMENTS

| JP | 2001-143668 A | 5/2001 |
| JP | 2002-289156 A | 10/2002 |
| JP | 2003-092103 A | 3/2003 |
| JP | 2004-014395 A | 1/2004 |
| JP | 2004-063231 A | 2/2004 |
| JP | 2005-183359 A | 7/2005 |
| JP | 2006-093122 A | 4/2006 |
| JP | 2009-087613 A | 4/2009 |
| JP | 2009-087722 A | 4/2009 |
| JP | 2009-277605 A | 11/2009 |
| JP | 2010-092592 A | 4/2010 |
| JP | 2010-097732 A | 4/2010 |
| JP | 2010-257945 A | 11/2010 |
| JP | 2011-216402 A | 10/2011 |
| KR | 10 2009-0081197 A | 7/2009 |

OTHER PUBLICATIONS

Korean Notice of Allowance in KR 10-2011-0119137, dated Jun. 24, 2013 (Kim).

Japanese Office Action in JP 2011-245552, dated May 21, 2013 (Kim).

European Search Report in EP 11189259.2-2119, dated Feb. 24, 2012 (Kim).

* cited by examiner

SECONDARY BATTERY

CROSS-REFERENCE TO RELATED APPLICATION

The present application claims priority under 35 U.S.C. §119(e) to U.S. Provisional Application No. 61/413,589, filed on Nov. 15, 2010, and entitled: "Secondary Battery," which is incorporated herein by reference in its entirety.

BACKGROUND

1. Field

Embodiments relate to a second battery.

2. Description of the Related Art

Secondary batteries are rechargeable. Secondary batteries may be used in high-tech small electronic devices such as cellular phones, notebook computers, and camcorders, or be used as high capacity power sources for driving motors of electric vehicles or hybrid vehicles.

SUMMARY

An embodiment is directed to a battery, including a cap plate, the cap plate having an opening penetrating therethrough and having at least a first protrusion extending from a first side, an electrode terminal extending through the opening in the cap plate, a collector extending from the electrode terminal, and a gasket interposed between a portion of the electrode terminal and the first side of the cap plate, the first protrusion extending through the gasket and the collector.

The electrode terminal and the collector may be separate members, the electrode terminal and the collector being in electrical contact at an interface thereof.

The collector may include an opening penetrating therethrough, the gasket and the first protrusion each extending into the opening in the collector, and an end of the first protrusion may be expanded against a portion of the gasket such that the electrode terminal is clamped between the collector and the cap plate.

The first protrusion may extend through the opening in the collector.

The electrode terminal may be integral with the collector.

The electrode terminal may be welded to the collector.

The electrode terminal may be electrically isolated from the cap plate.

The collector may include a slit, the gasket and the first protrusion each extending into the slit.

An end of the first protrusion may be expanded so as to press a portion of the gasket that extends into the slit against the collector.

The first protrusion may extend through the slit.

The slit may have an arc shape, the portion of the gasket extending into the slit having a shape corresponding to the arc shape so as to fill the slit.

The electrode terminal may have a relatively wider portion, the relatively wider portion extending lateral to an extending direction of the electrode terminal, along a surface of the gasket, the gasket being pressed between the relatively wider portion of the electrode terminal and the first surface of the cap plate.

The battery may further include a nut and a washer on the electrode terminal at a second side of the cap plate opposite the first side, the nut threading onto the electrode terminal, the gasket being interposed between the relatively wider portion of the electrode terminal and the nut.

The battery may further include a nut and a washer on the electrode terminal at a second side of the cap plate opposite the first side, the washer contacting the second side of the cap plate, the washer being an electrical insulator.

The electrode terminal may be electrically isolated from the cap plate.

The gasket may be interposed between a side of the electrode terminal and an inner periphery of the opening in the cap plate, and may be interposed between the first surface of the cap plate and the collector.

The battery may further include an insulator interposed between the gasket and the collector, the insulator surrounding the slit.

The first protrusion may not contact the collector.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, a second battery will now be described according to embodiments.

Figure 1:
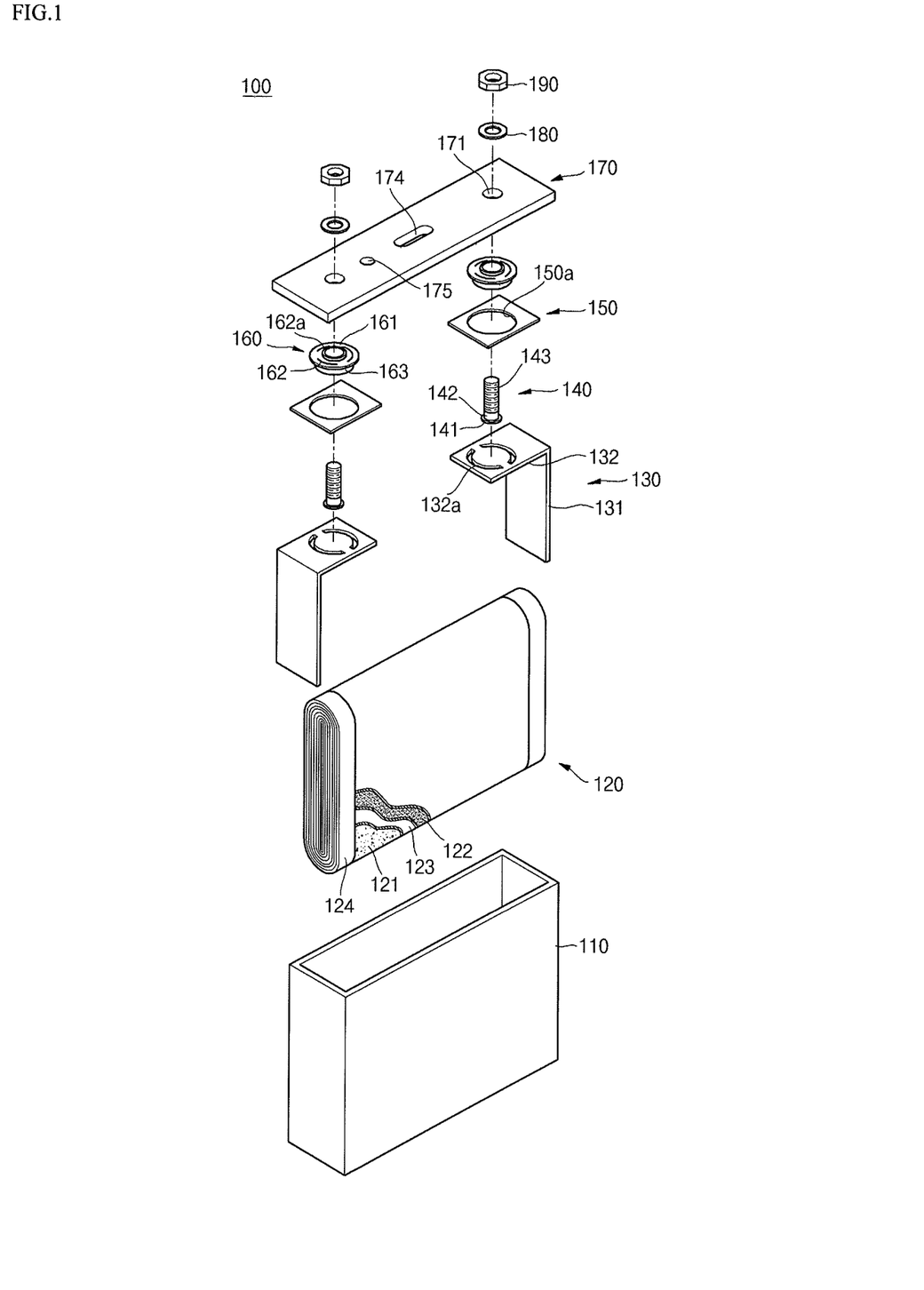
FIG. 1 illustrates an exploded perspective view of a secondary battery according to an example embodiment.
Figure 2:
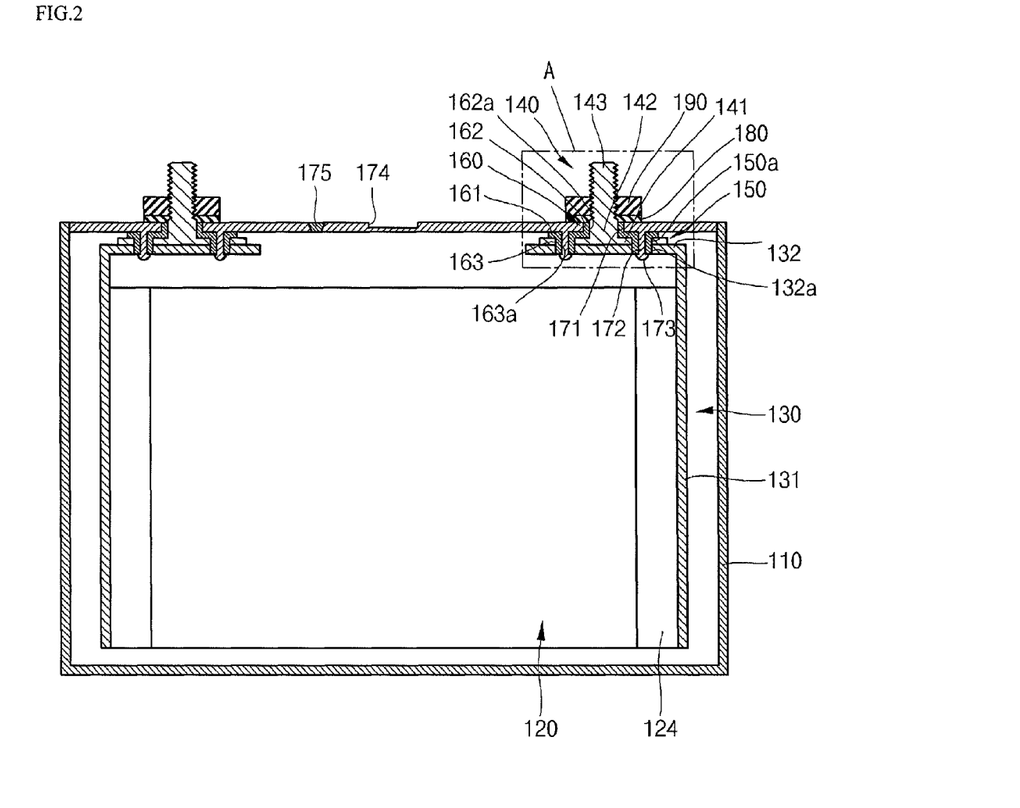
FIG. 2 illustrates a cross-sectional view of a secondary battery according to an example embodiment.
Figure 3:
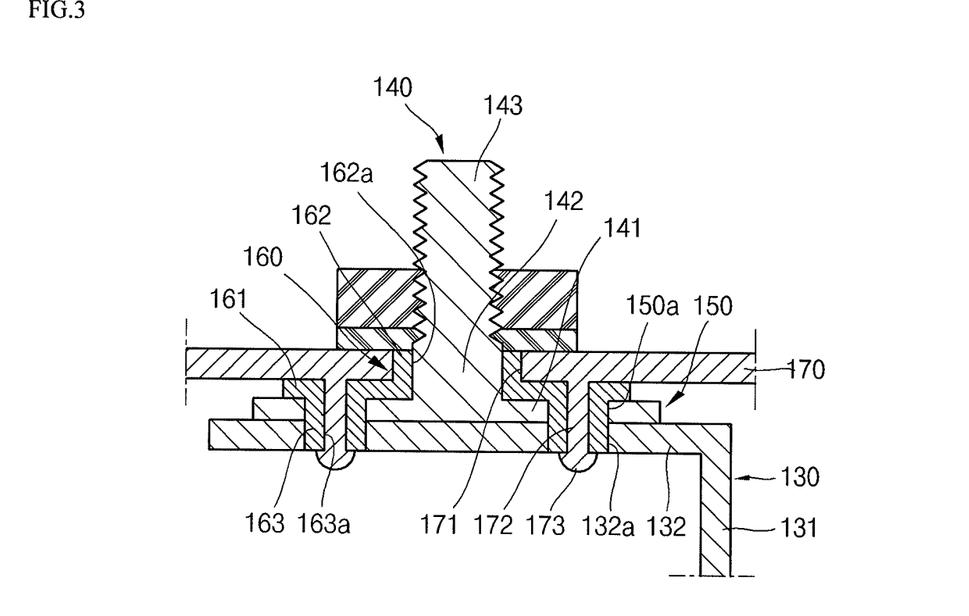
FIG. 3 illustrates an enlarged view of a region 'A' of FIG. 2.
Figure 4A:
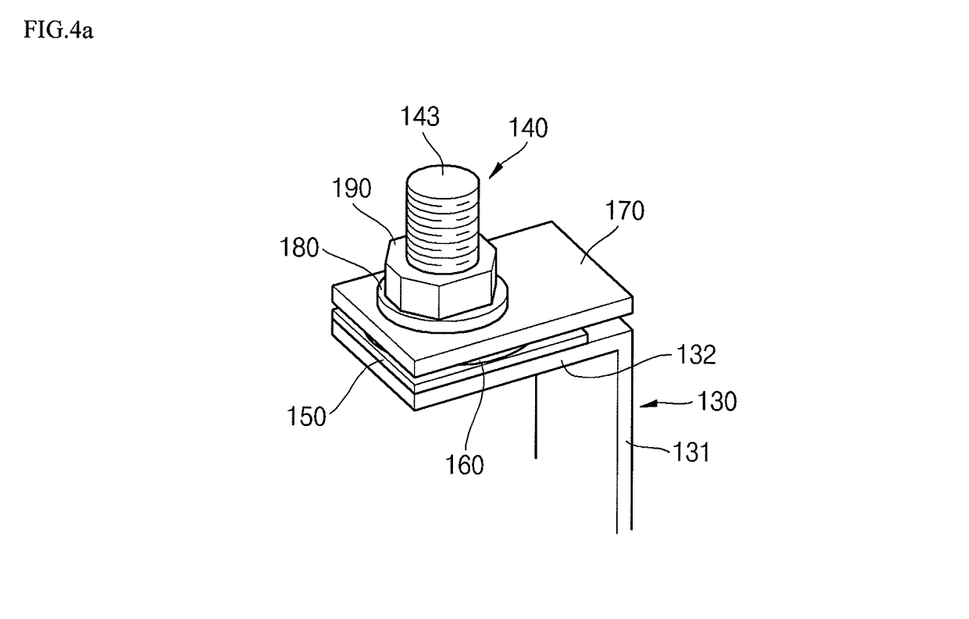
FIGS. 4a and 4b illustrate perspective views of a collector, an electrode terminal, a gasket, and a cap plate of a secondary battery according to an example embodiment.
Figure 4B:
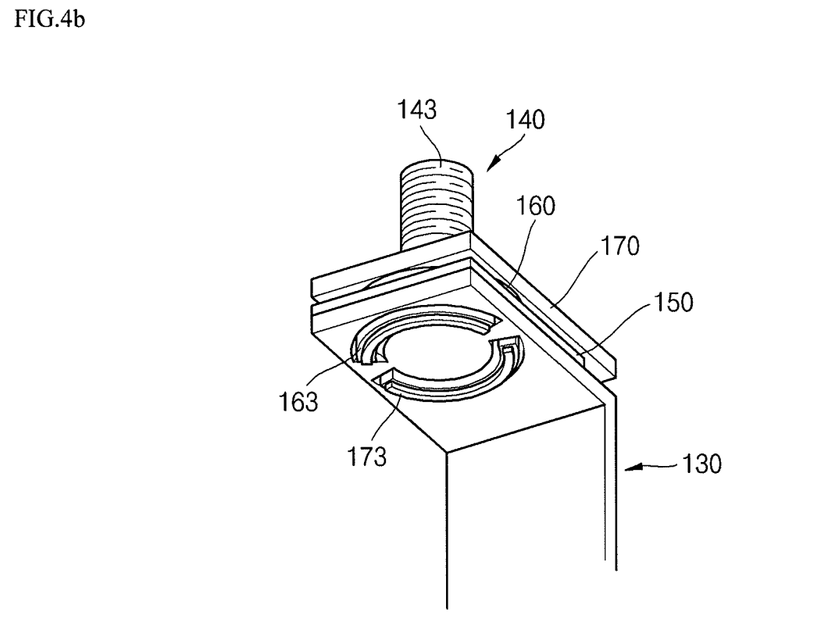

FIG. 1 illustrates an exploded perspective view of a secondary battery according to an example embodiment. FIG. 2 illustrates a cross-sectional view of a secondary battery according to an example embodiment. FIG. 3 illustrates an enlarged view of a region 'A' of FIG. 2. FIGS. 4a and 4b illustrate perspective views of a collector, an electrode terminal, a gasket, and a cap plate of a secondary battery according to an example embodiment.

Referring to FIGS. 1 through 4b, a secondary battery 100 according to an example embodiment may include a case 110, an electrode assembly 120, collectors 130, electrode terminals 140, insulators 150, gaskets 160, a cap plate 170, and nuts 190. Washers 180 may be disposed between the cap plate 170 and the nuts 190.

The case 110 may formed of a conductive metal such as aluminum, aluminum alloy, or steel plated with nickel. The case 100 may have an approximately hexahedron shape provided with an opening through which the electrode assembly 120 and the collectors 130 are inserted and placed. The opening may be open toward the upper side of the case 110.

The electrode assembly 120 may be formed by winding or stacking a first electrode plate 121, a second electrode plate 122, and a separator 123, the separator 123 being disposed between the first and second electrode plates 121 and 122, which may have a thin plate or film shape.

In an implementation, the first electrode plate 121 may function as a positive electrode, and the second electrode plate 121 may function as a negative electrode. In this case, the first electrode plate 121 may be formed by applying a first electrode active material (such as a transition metal oxide) on a first electrode collector (which may be formed of metal foil such as aluminum foil), and the second electrode plate 122 may be formed by applying a second electrode active material (such as graphite or carbon) on a second electrode collector (which may be formed of metal foil such as nickel or copper foil). In another implementation, the polarities of the first and second electrode plates 121 and 122 may be interchanged with each other.

The separator 123 disposed between the first electrode plate 121 and the second electrode plate 122 may prevent a short circuit and allow the movement of lithium ions. The separator 123 may be formed of, e.g., polyethylene, polypropylene, a combination film of polyethylene and polypropylene, etc.

The first and second electrode plates 121 and 122 may each include non-coated portions 124 that are disposed at regions beyond the first and second electrode active materials, respectively. The non-coated portions 124 of the electrode plates may be connected to respective ones of the collectors 130 to form current paths.

The collectors 130 may be connected to the respective non-coated portions 124 of the electrode plates. The collector 130 may includes a first region 131 connected to the non-coated portion 124, and a second region 132 bent from the first region 131.

The first region 131 of the collector 130 may extend in a first direction that is a longitudinal direction of the non-coated portions 124 of the electrodes. The first region 131 of the collector 130 may pressed to and coupled to a side surface of the non-coated portion 124 of the corresponding electrode. The first region 131 of the collector 130 may be coupled to the non-coated portion 124 of the corresponding electrode through welding.

The second region 132 of the collector 130 may extend from the first region 131 of the collector 130. The second region 132 of the collector 130 may extend in a second direction that is approximately perpendicular to the first direction. A slit 132a may be formed in the second region 132. For example, two symmetric arc-shaped slits 132a may be formed in the second region 132.

The electrode terminal 140 and the gasket 160 may pass through the slit(s) 132a, so that the second region 132 can be coupled to the electrode terminal 140 and the gasket 160. The electrode terminal 140 may be coupled to the upper portion of the collector 130. The electrode terminal 140 may be coupled in the first direction to the upper surface of the second region 132 of the collector 130. The electrode terminal 140 may be approximately perpendicular to the second region 132 of the collector 130. The electrode terminal 140 may be a separate structure from the collector 130, and may be held in place by pressure applied between the cap plate 170 and the second region 132 of the collector 130. In another implementation, the electrode terminal 140 may be integrally formed with the collector 130. In another implementation, the electrode terminal 140 may be coupled to the collector 130 through welding.

The electrode terminal 140 may include a first region 141 contacting the second region 132 of the collector 130, a second region 142 connected to the first region 141, and a third region 143 connected to the second region 142 and protruding to the upper side of the cap plate 170.

The first region 141 of the electrode terminal 140 may be disposed on the upper portion of the second region 132 of the collector 130. The first region 141 of the electrode terminal 140 may be coupled to the second region 132 of the collector 130, and may be disposed between the slits 132a. For example, the electrode terminal 140 may be coupled to the second region 132 between a pair of slits 132a. The slits 132a may surround the first region 141 of the electrode terminal 141. The first region 141 of the electrode terminal 140 may contact the second region 132 of the collector 130 and thus be electrically and mechanically connected to the second region 132 of the collector 130. The first region 141 of the electrode terminal 140 may extend in the second direction in the form of a flange and, as described below, the gasket 160 and the cap plate 170 may be pressed together with the upper portion of the first region 141 of the electrode terminal 140 so as to be mechanically coupled to the collector 130. Thus, the first region 141 of the electrode terminal 140 may be disposed between the collector 130 and the cap plate 170 to fix the electrode terminal 140.

The second region 142 of the electrode terminal 140 may protrude in the first direction that is approximately perpendicular to the first region 141 of the electrode terminal 140, i.e., perpendicular to the extending direction of the flange of the electrode terminal 140. The second region 142 of the electrode terminal 140 may connect the first region 141 of the electrode terminal 140 to the third region 143 of the electrode terminal 140 to form a current path, and support the third region 143 of the electrode terminal 140 that protrudes to the upper side of the cap plate 170. The second region 142 of the electrode terminal 140 may have a height approximately corresponding to the sum of the thickness of the gasket 160 and the thickness of the cap plate 170. The second region 142 of the electrode terminal 140 may have a smaller cross-section than that of the first region 141 of the electrode terminal 140, e.g., it may have a diameter less than that of the electrode terminal flange. Thus, when the cap plate 170 is coupled to the upper portion of the second region 142 of the electrode terminal 140 in the first direction, the cap plate 170 may press the first region 141 of the electrode terminal 140. Thus, the electrode terminal 140 may be securely coupled electrically and mechanically to the collector 130 by the coupling force of the cap plate 170, even where the electrode terminal 140 is a separate member from the collector 130.

The third region 143 of the electrode terminal 140 may protrude in the first direction. The third region 143 of the electrode terminal 140 may protrude to the upper side of the cap plate 170, and may have a thread thereon. The third region 143 of the electrode terminal 140 may be coupled with the washer 180 and the nut 190, the nut 190 being coupled to the thread to press the cap plate 170 between the first region 141 of the electrode terminal 140 and the nut 190, thereby providing high coupling force.

The insulator 150 may be disposed on the upper portion of the collector 130. The insulator 150 may have a circular hole 150a to surround the first region 141 of the electrode terminal 140. The hole 150a may have a size such that an inner edge thereof corresponds to an outer edge of the slit 132a, as shown in FIG. 3. The insulator 150 may help improve a sealing performance of the gasket 160, and may prevent the collector 130 from contacting the cap plate 170 thereby helping to electrically insulate the cap plate 170 from the collector 130.

The gasket 160 may be coupled to the electrode terminal 140 and the insulator 150 in the first direction from the upper side thereof. The gasket 160 may be coupled to the first region 141 of the electrode terminal 140, pressing the first region 141 of the electrode terminal 140. In addition, the gasket 160 may be coupled to the cap plate 170 from the lower side thereof to seal the cap plate 170. Thus, the gasket 160 may prevent leakage of the electrolyte out of the case 110.

The cap plate 170 may include a portion that passes through the gasket 160, and the gasket 160 may prevent the cap plate 170 from contacting the collector 130 and the electrode terminal 140 to electrically insulate the cap plate 170 therefrom.

The gasket 160 may includes a first region 161 disposed on the upper portion of the first region 141 of the electrode terminal 140, a second region 162 protruding upward from the first region 161 and coupling to the cap plate 170, and a third region 163 protruding downward from the first region 161 and coupling to the collector 130.

The first region 161 of the gasket 160 may press the first region 141 of the electrode terminal 140 from the upper side thereof. The first region 161 of the gasket 160 may extend in the second direction onto a portion of the top surface of the insulator 150 to press the insulator 150 from the upper side thereof. Thus, the first region 161 of the gasket 160 may fill a gap between the insulator 150 and the gasket 160 to prevent leakage of the electrolyte. The first region 161 of the gasket 160 may electrically insulate the electrode terminal 140 from the cap plate 170.

The second region 162 of the gasket 160 may protrude upward from the first region 161 of the gasket 160. The second region 162 of the gasket 160 may pass through the cap plate 170. The second region 162 of the gasket 160 may have an upper through-hole 162a through which the second region 142 of the electrode terminal 140 protrudes. The second region 162 of the gasket 160, together with the first region 161 of the gasket 160, may electrically insulate the electrode terminal 140 from the cap plate 170.

The third region 163 of the gasket 160 may protrude downward from the first region 161 of the gasket 160. The third region 163 of the gasket 160 may pass between the insulator 150 and the first region 141 of the electrode terminal 140, and protrude out of the lower portion of the second region 132 of the collector 130. The second region 162 of the gasket 160 may have a lower through-hole 163a. A portion of the cap plate 170 may pass through the lower through-hole 163a and protrude out of the lower portion of the collector 130, such that the cap plate 170 is mechanically connected to the collector 130 to improve coupling force for the electrode terminal 140.

The cap plate 170 may be disposed on the upper side of the case 110 to seal the case 110. The cap plate 170 may be welded to the edge of the opening part of the case 110 to seal the case 110.

The cap plate 170 may have terminal holes 171 in the regions where the electrode terminals 140 are disposed. The inner wall of the terminal hole 171 may surround the second region 162 of the gasket 160, and the electrode terminal 140 may protrude through the upper through-hole 162a of the second region 162 of the gasket 160. Thus, the cap plate 170 may be electrically insulated from the electrode terminal 140.

As described above, a portion of the cap plate 170 may pass through the lower through-hole 163a and protrude out of the lower portion of the collector 130. In this regard, the cap plate 170 may include protrusions 172 protruding downward from the edges of the terminal holes 171. The cap plate 170 may be coupled to the collectors 130 by the protrusions 172.

In an implementation, the protrusion 172 may pass through the lower through-hole 163a of the third region 163 of the gasket 160. The third region 163 of the gasket 160 may surround a side portion of the protrusion 172 to insulate the protrusion 172 from the collector 130. As a result, the cap plate 170 may be mechanically connected to the collector 130 by way of the protrusion 172, while, at the same time, being maintained in electrical isolation from the collector 130.

The cap plate 170 may include rivet parts 173 on the lower surfaces of the protrusions 172. The rivet part 173 may be formed by riveting (or caulking or deforming) the lower surface of the protrusion 172. The rivet part 173 may be formed along the third region 163 of the gasket 160. The rivet part 173 may be expanded by riveting to fix the gasket 160 to prevent the protrusion 172 from being removed from the gasket 160. In this case, the rivet part 173 may contact only the third region 163 of the gasket 160 without contacting the second region 132 of the collector 130, so that the cap plate 170 can be electrically insulated from the collector 130.

A safety vent 174 and an electrolyte injection plug 175 may be provided at the upper surface of the cap plate 170. The safety vent 174 may be thinner than the other parts of the cap plate 170. Thus, when the inner pressure of the case 110 increases, the safety vent 174 may be opened first to secure the safety of the secondary battery 100. The electrolyte injection plug 175 may be used to seal an injection hole after injecting the electrolyte into the case 110.

The washer 180 may be disposed on the upper portion of the cap plate 170, and may be coupled with the electrode terminal 140. The washer 180 may be disposed on the third region 143 of the electrode terminal 140, and may help prevent the nut 190 from being released from the electrode terminal 140. In the case that the cap plate 170 is to be maintained electrically insulated from the electrode terminal 140, the washer 180 may be formed of an insulating material.

The nut 190 may be coupled in the first direction from the upper side of the electrode terminal 140. The nut 190 may have a thread on the inner surface thereof, which engages with the tread formed on the outer surface of the third region 143 of the electrode terminal 140. The coupling force between the nut 190 and the electrode terminal 140 may be used to securely couple the electrode terminal 140 and the collector 130 to the cap plate 170.

As described above, the secondary battery 100 according to an embodiment includes the protrusion 172 on the lower surface of the cap plate 170 to couple the protrusion 172 to the collector 130, so that the cap plate 170 can be securely coupled to the collector 130. The secondary battery 100 may include the rivet part 173 in the lower portion of the protrusion 172 to improve the coupling force of the protrusion 172. In addition, the secondary battery 100 may include the gasket 160 between the collector 130 and the protrusion 172 of the cap plate 170, so that the collector 130 is electrically insulated from the protrusion 172 of the cap plate 170.

Hereinafter, a method of fabricating a secondary battery will now be described according to an example embodiment.

Figure 5:
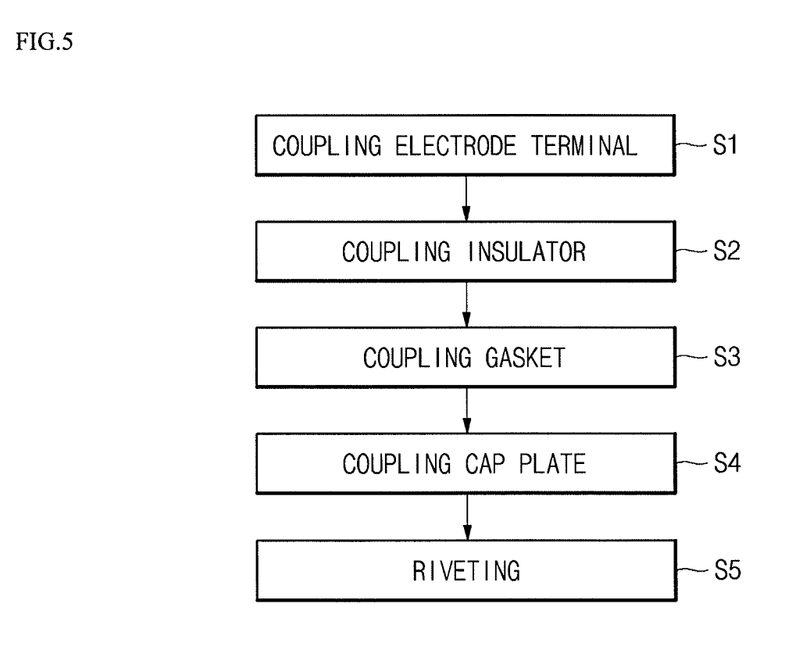
FIG. 5 illustrates a flowchart of a method of fabricating a secondary battery according to an example embodiment.

FIG. 5 illustrates a flowchart of a method of fabricating a secondary battery according to an example embodiment. FIGS. 6a through 6f illustrate schematic views of stages in a method of fabricating a secondary battery according to an example embodiment.

Referring to FIG. 5, a method of fabricating the secondary battery 100 includes an electrode terminal coupling operation S1, an insulator coupling operation S2, a gasket coupling operation S3, and a cap plate coupling operation S4. The method of fabricating the secondary battery 100 may further include a riveting operation S5 after the cap plate coupling operation S4. Hereinafter, each operation of FIG. 5 will be described with reference FIGS. 6a to FIG. 6f.

Figure 6A:
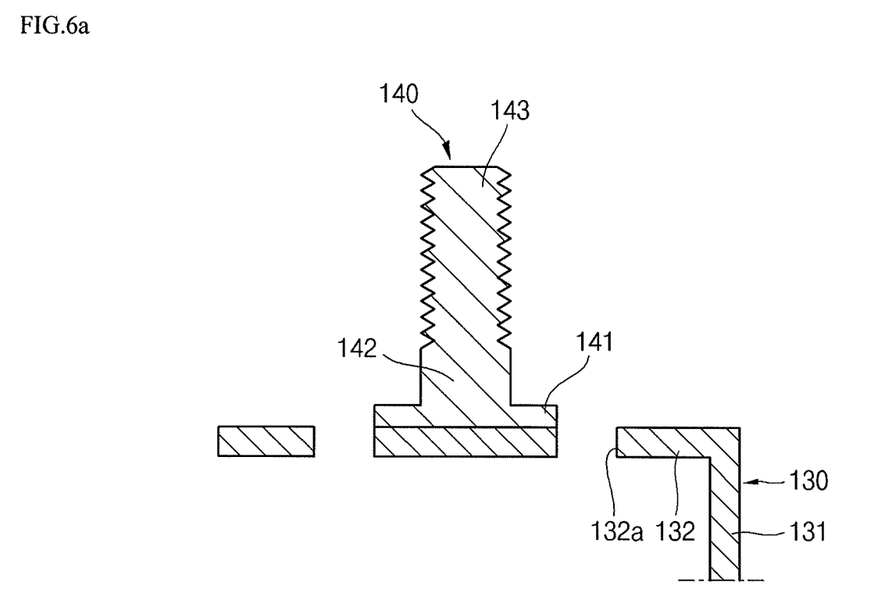
FIGS. 6a through 6f illustrate schematic views of stages in a method of fabricating a secondary battery according to an example embodiment.

Referring to FIGS. 5 and 6a, in the electrode terminal coupling operation S1, the electrode terminal 140 is coupled to the collector 130. The electrode terminal 140 is arranged on the second region 132 of the collector 130. The electrode terminal 140 may be welded to the second region 132 to improve the coupling force, or may be integrally formed with the collector 130.

Figure 6B:
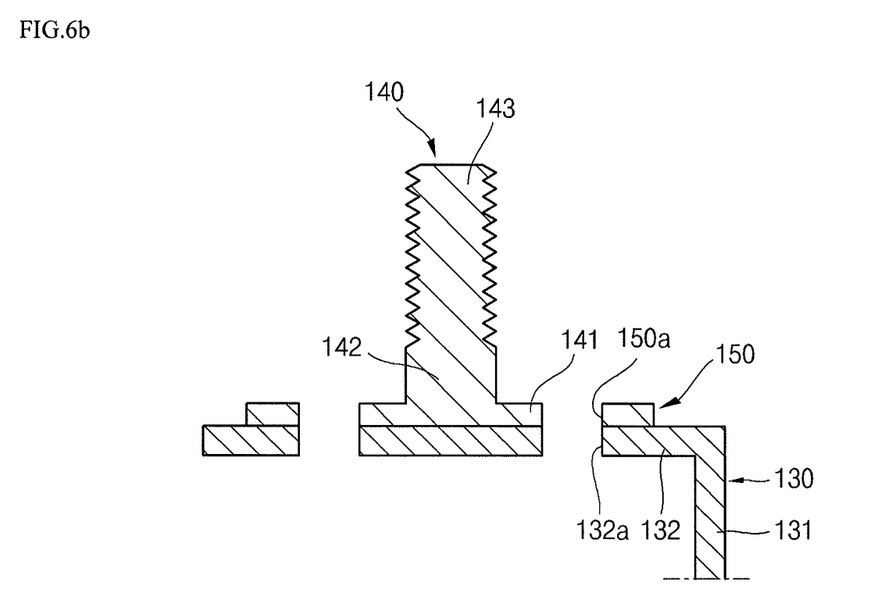

Referring to FIGS. 5 and 6b, in the insulator coupling operation S2, the insulator 150 is coupled to the upper portion of the collector 130. The insulator 150 is disposed around the outer circumferential surface of the electrode terminal 140. For example, the insulator 150 may include circular hole 150a, such that the insulator 150 can be disposed around the outer circumferential surface of the electrode terminal 140.

Figure 6C:
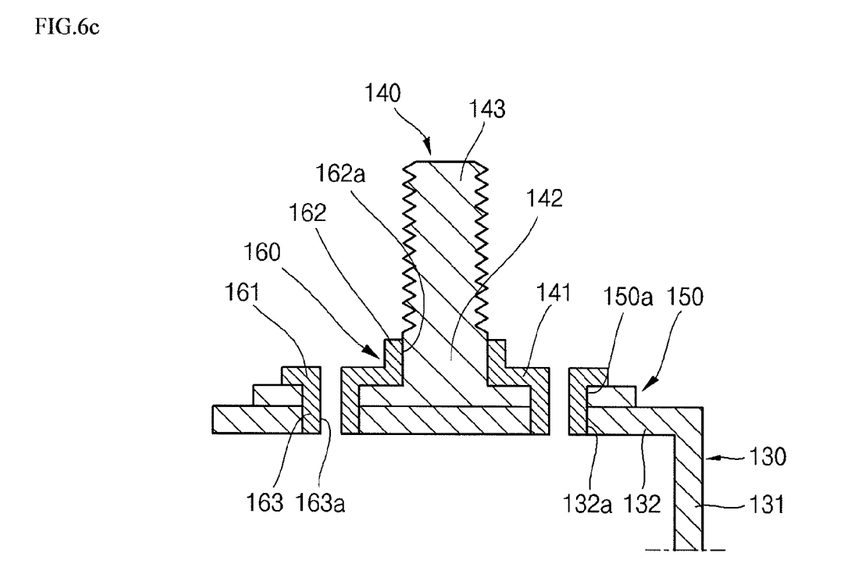

Referring to FIGS. 5 and 6c, in the gasket coupling operation S3, the gasket 160 is coupled to the electrode terminal 140 and the insulator 150 in the first direction from the upper side of the electrode terminal 140 and the insulator 150. At this point, the electrode terminal 140 passes through the upper through-hole 162a of the second region 162. The third region 163 of the gasket 160 passes through the slit 132a formed in the second region 132 of the collector 130. The gasket 160 is coupled to the electrode terminal 140 and the insulator 150 to press the electrode terminal 140 and the insulator 150 to the collector 130.

Figure 6D:
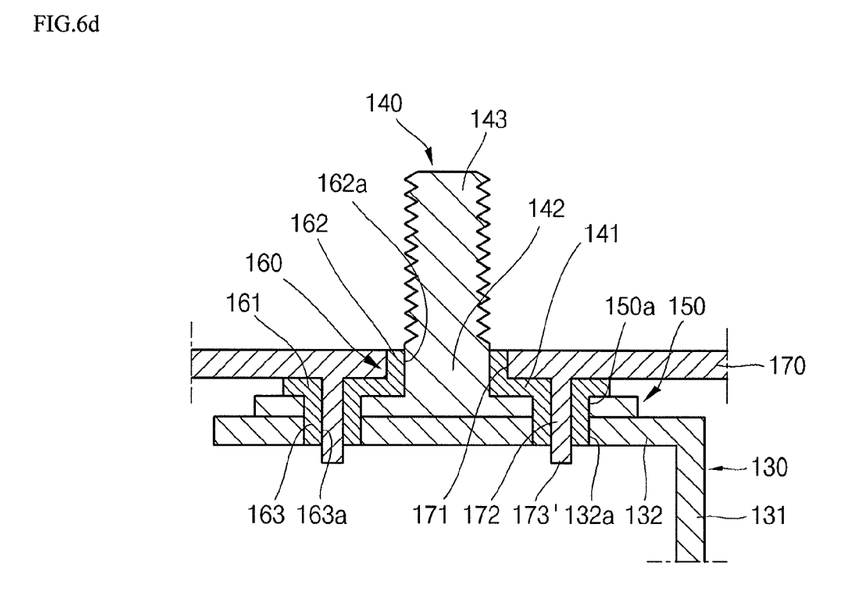

Referring to FIGS. 5 and 6d, in the cap plate coupling operation S4, the cap plate 170 is coupled to the gasket 160 in the first direction from the upper side of the gasket 160. The second region 162 of the gasket 160 passes through the terminal hole 171 to couple to the cap plate 170. The cap plate 170 contacts the first region 161 of the gasket 160. At this point, a lower part 173' of the protrusion 172 of the cap plate 170 passes through the lower through-hole 163a of the gasket 160 and protrudes out of the lower portion of the collector 130.

Figure 6E:
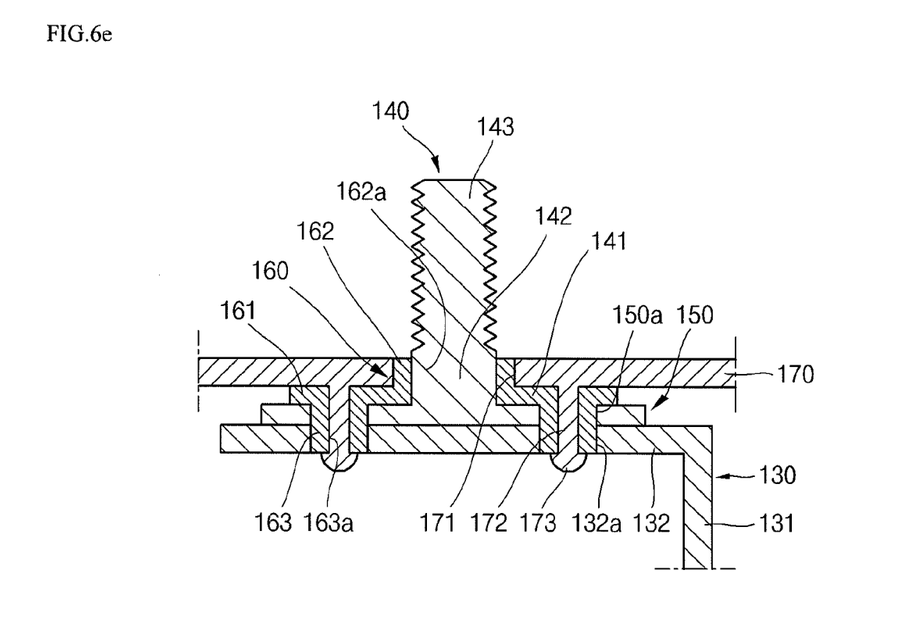
Figure 6F:
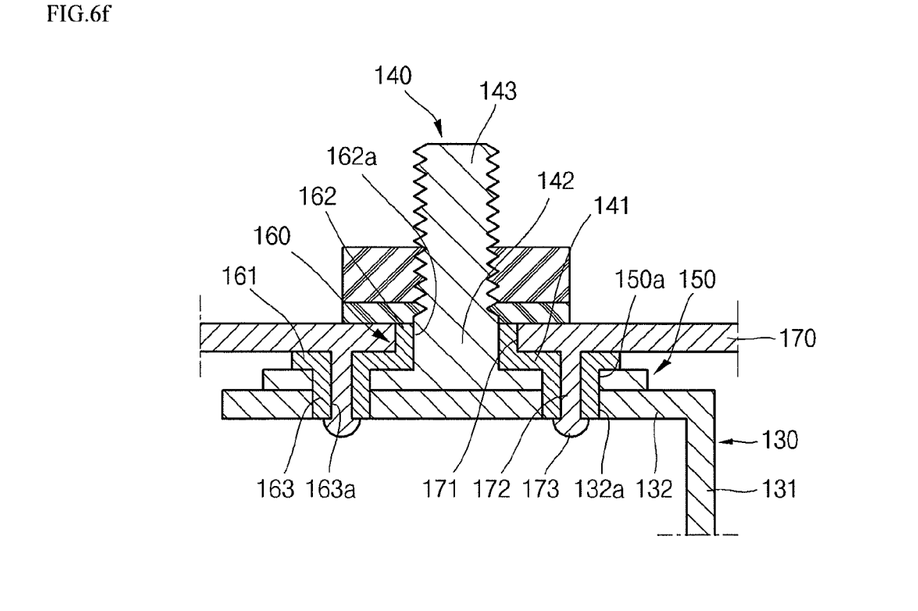

Referring to FIGS. 5 and 6E, in the riveting operation S5, the lower part 173' of the protrusion 172 is riveted from the lower surface thereof. The lower part 173' of the protrusion 172 is riveted to form the rivet part 173. The rivet part 173 securely couples the cap plate 170 to the gasket 160.

By way of summation and review, a secondary battery may include an electrode assembly within a case, and electrode terminals connected to the electrode assembly and protruding to the upper side of a cap plate. The secondary battery may be required to prevent leakage of electrolyte out of the case to ensure reliability. Thus, it is may be important to secure the strength of a secondary battery. As described above, an example embodiment may provide a secondary battery that improves the coupling force between a collector and a cap plate to prevent electrolyte leakage.

A secondary battery according to an example embodiment may include a case, an electrode assembly inserted in the case, an electrode terminal of a collector connected to a non-coated portion of the electrode assembly, a gasket disposed on the upper portion of the electrode terminal, and a cap plate including a protrusion disposed on a lower surface and passing through the gasket and extending down to the collector. The gasket may have a part on the lower surface thereof that passes through the collector. The gasket may surround the outer circumferential surface of the protrusion of the cap plate. The collector may have at least one slot for coupling to the protrusion. The lower portion of the protrusion of the cap plate may be riveted to form a rivet part. The rivet part may be spaced apart from the collector by the gasket.

A secondary battery according to an example embodiment may include a protrusion on the lower surface of a cap plate to securely couple the cap plate to the collector, thereby improving the mechanical strength thereof. A secondary battery according to an example embodiment may includes a rivet part in the lower portion of a protrusion to improve the coupling force thereof. A secondary battery according to an example embodiment may include a gasket between a collector and a protrusion of a cap plate to electrically insulate the collector and the cap plate from each other.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery, comprising:
a cap plate, the cap plate having an opening penetrating therethrough and having at least a first protrusion extending from a first side;
an electrode terminal extending through the opening in the cap plate;
a collector extending from the electrode terminal; and
a gasket interposed between a portion of the electrode terminal and the first side of the cap plate, the first protrusion extending through the gasket and the collector.

2. The battery as claimed in claim 1, wherein the electrode terminal and the collector are separate members, the electrode terminal and the collector being in electrical contact at an interface thereof.

3. The battery as claimed in claim 2, wherein the collector includes an opening penetrating therethrough, the gasket and the first protrusion each extending into the opening in the collector, and an end of the first protrusion is expanded against a portion of the gasket such that the electrode terminal is clamped between the collector and the cap plate.

4. The battery as claimed in claim 3, wherein the first protrusion extends through the opening in the collector.

5. The battery as claimed in claim 1, wherein the electrode terminal is integral with the collector.

6. The battery as claimed in claim 1, wherein the electrode terminal is welded to the collector.

7. The battery as claimed in claim 1, wherein the electrode terminal is electrically isolated from the cap plate.

8. The battery as claimed in claim 1, wherein the collector includes a slit, the gasket and the first protrusion each extending into the slit.

9. The battery as claimed in claim 8, wherein an end of the first protrusion is expanded so as to press a portion of the gasket that extends into the slit against the collector.

10. The battery as claimed in claim 9, wherein the first protrusion extends through the slit.

11. The battery as claimed in claim 9, wherein the slit has an arc shape, the portion of the gasket extending into the slit having a shape corresponding to the arc shape so as to fill the slit.

12. The battery as claimed in claim 1, wherein the electrode terminal has a relatively wider portion, the relatively wider portion extending lateral to an extending direction of the electrode terminal, along a surface of the gasket, the gasket being pressed between the relatively wider portion of the electrode terminal and the first surface of the cap plate.

13. The battery as claimed in claim 12, further comprising a nut and a washer on the electrode terminal at a second side of the cap plate opposite the first side, the nut threading onto the electrode terminal, the gasket being interposed between the relatively wider portion of the electrode terminal and the nut.

14. The battery as claimed in claim 1, further comprising a nut and a washer on the electrode terminal at a second side of the cap plate opposite the first side, the washer contacting the second side of the cap plate, the washer being an electrical insulator.

15. The battery as claimed in claim 14, wherein the electrode terminal is electrically isolated from the cap plate.

16. The battery as claimed in claim 15, wherein the gasket is interposed between a side of the electrode terminal and an inner periphery of the opening in the cap plate, and is interposed between the first surface of the cap plate and the collector.

17. The battery as claimed in claim 16, further comprising an insulator interposed between the gasket and the collector, the insulator surrounding the slit.

18. The battery as claimed in claim 16, wherein the first protrusion does not contact the collector.

* * * * *